US009655132B2

(12) United States Patent
Caretti et al.

(10) Patent No.: US 9,655,132 B2
(45) Date of Patent: May 16, 2017

(54) UPLINK INTERFERENCE MITIGATION IN HETEROGENEOUS MOBILE NETWORKS

(75) Inventors: Marco Caretti, Turin (IT); Giuseppe Catalano, Turin (IT); Gian Michele Dell'Aera, Turin (IT); Bruno Melis, Turin (IT)

(73) Assignee: TELECOM ITALIA S.p.A., Milan (IT)

(*) Notice: Subject to any disclaimer, the term of this patent is extended or adjusted under 35 U.S.C. 154(b) by 7 days.

(21) Appl. No.: 14/419,597

(22) PCT Filed: Aug. 10, 2012

(86) PCT No.: PCT/EP2012/065711
§ 371 (c)(1),
(2), (4) Date: Feb. 4, 2015

(87) PCT Pub. No.: WO2014/023358
PCT Pub. Date: Feb. 13, 2014

(65) Prior Publication Data
US 2015/0208425 A1    Jul. 23, 2015

(51) Int. Cl.
*H04W 72/08* (2009.01)
*H04W 72/04* (2009.01)
(Continued)

(52) U.S. Cl.
CPC ..... *H04W 72/082* (2013.01); *H04W 72/0426* (2013.01); *H04W 16/10* (2013.01); *H04W 84/045* (2013.01)

(58) Field of Classification Search
CPC ........... H04W 72/082; H04W 72/0426; H04W 84/045; H04W 16/10
See application file for complete search history.

(56) References Cited

U.S. PATENT DOCUMENTS

| | | |
|---|---|---|
| 2007/0207812 A1 | 9/2007 | Borran et al. |
| 2010/0220597 A1 | 9/2010 | Ji et al. |

(Continued)

FOREIGN PATENT DOCUMENTS

| | | |
|---|---|---|
| WO | 2010 099485 | 9/2010 |
| WO | 2011 005373 | 1/2011 |
| WO | 2011 057037 | 5/2011 |

OTHER PUBLICATIONS

3GPP TSG-RAN WG3, "TP on UL Interference solutions for Carrier Based HetNet", Ericsson (Rapporteur), total 4 pages, (Mar. 26-30, 2012) XP 050610899.
(Continued)

*Primary Examiner* — Pao Sinkantarakorn
*Assistant Examiner* — Kabir Jahangir
(74) *Attorney, Agent, or Firm* — Oblon, McClelland, Maier & Neustadt, L.L.P.

(57) ABSTRACT

A method for controlling a heterogeneous wireless network (100) is proposed. The heterogeneous wireless network (100) comprises at least one first base station (115) which manages communication of a plurality of first user equipments (125M) positioned in at least one first cell (105) and at least one second base station (120) which manages communication of a plurality of second user equipments (125*p*) positioned in at least one second cell (110). Moreover, in the heterogeneous network (100), for each first user equipment (125M) the at least one first base station (115) provides a respective first allocation information set over a respective first allocation time interval. Similarly, the at least one second base station (120) provides for each second user equipment (125*p*) a respective second allocation information set over a respective second allocation time interval. Furthermore, each first allocation information set and each second allocation information set define transmission resources for communications of each first user equipment (125M) and of each second user equipment (125M), respectively. In the heterogeneous wireless network (100), the at least one second cell (110) is at least partially comprised in the first cell (105). The method comprises the following steps. Said at least one first base station determines (305) a set of probably interfering first user equipments (125$_M$) with at least one of the plurality of second user equipments (Continued)

($125_p$). Said step of determining the set of probably interfering first user equipments ($125_M$) comprises the following steps. Comparing each second allocation information set with each first allocation information set having the first allocation time interval at least partially overlapped with the respective second allocation time interval, and identifying as a probably interfering first user equipment ($125_M$) each first user equipment ($125_M$) for which a correspondence is verified in said comparing allocation information sets. The method further comprises the following steps. Said at least one second base station (120) defines a detection time window in order to analyze univocal identifiers transmitted by probably interfering first user equipments ($125_M$) in said set. The method comprises identifying (315) a subset of effectively interfering first user equipments ($125_M$) with the plurality of second user equipments ($125_p$). Said at least one first base station (115) modifies (325) said transmission resources for at least one first user equipment ($125_M$) comprised in the subset of effectively interfering first user equipments ($125_M$) in order to mitigate interferences.

19 Claims, 4 Drawing Sheets

(51) Int. Cl.
*H04W 16/10* (2009.01)
*H04W 84/04* (2009.01)

(56) References Cited

U.S. PATENT DOCUMENTS

| | | |
|---|---|---|
| 2010/0238888 A1 | 9/2010 | Sampath et al. |
| 2010/0238901 A1 | 9/2010 | Sampath et al. |
| 2010/0240382 A1 | 9/2010 | Sampath et al. |
| 2011/0110251 A1 | 5/2011 | Krishnamurthy et al. |
| 2012/0015664 A1 | 1/2012 | Han |
| 2013/0107785 A1* | 5/2013 | Bhattad .................. H04J 11/005 370/312 |
| 2014/0036786 A1* | 2/2014 | Kazmi ................ H04W 52/146 370/329 |
| 2014/0362832 A1* | 12/2014 | Rudolf .................. H04L 1/1822 370/336 |

OTHER PUBLICATIONS

3GPP TSG-RAN WG3 #75bis R3-120789, "Macro-Pico UL interference mitigation based on DMRS measurements", Telecom Italia, total 4 pages, (Mar. 26-30, 2012) XP 050610809.

3GPP TSG-RAN WG3 #76 R3-121299, "Analysis of Solutions for Mitigation of UL Interference in CB-ICIC", Ericsson, Telecom Italia, Kyocera Corp., Fujitsu, total 6 pages (May 21-25, 2012) XP 050611307.

Written Opinion of the International Searching Authority Issued Dec. 5, 2012 in PCT/EP12/065711 Filed Aug. 10, 2012.

International Search Report Issued Dec. 5, 2012 in PCT/EP12/065711 Filed Aug. 10, 2012.

\* cited by examiner

UPLINK INTERFERENCE MITIGATION IN HETEROGENEOUS MOBILE NETWORKS

BACKGROUND

Field

The present invention relates to communication systems. More particularly, the present invention relates to the field of wireless or mobile telecommunication networks. Even more particularly, the present invention relates to high speed transmission networks, such as wireless telecommunication networks belonging to the so called fourth generation (4G), including networks based upon Long Term Evolution (LTE) and/or Long Term Evolution Advanced (LTE-A) standards.

Overview of the Related Art

High-speed transmission networks, or simply networks, are able to simultaneously provide different services (e.g., voice and/or video real-time communications, data transfer, Web browsing, broadcasting, etc.) to a given number of user equipments (UEs, such as mobile phones, personal digital assistants, tablets, personal computers etc.).

Networks generally include a plurality of base stations, each of which manages communications for a given number of UEs. In the following, without any limitation, the term "eNode B" (eNB) (which is specifically used in LTE/LTE-A system) will be used as synonym of "base station". In general, one eNode B may control one or more cells.

Generally, networks comprise cells of various size and are therefore identified as a heterogeneous networks, or HetNets. Particularly, each cell may be categorized as a macro-cell, a pico-cell, or other types of cell according to the size of the covered geographic area. A macro-cell is a relatively large geographic area (e.g., an area having a radius in the order of the kilometers such as one or more city blocks) and the associated eNB—which is usually denoted as MeNB—allows unrestricted access to UEs therein. A pico-cell is a relatively small geographic area (e.g., with a radius in the order of hundred of meters such as a large building) and the associated eNB—which is usually denoted as PeNB—may both allow a restricted or unrestricted access to UEs.

Furthermore, in a HetNet, the MeNB are deployed in a regular way forming a substantially continuous overall coverage area for the network; conversely, PeNB and/or other types of eNB are deployed in a quite random fashion. Therefore, very often occurs that inside a macro-cell one or more pico-cells and/or other types of cells are deployed. In this way, one or more pico-cells and/or other cell types result superimposed with a macro-cell.

In operation, each UE establishes a communication with a cell via downlink and uplink channels for accessing the abovementioned services (i.e., the UE is connected to the cell). The downlink refers to the communication link from the eNB to the UE, and the uplink refers to the communication link from the UE to the eNB.

In order to achieve the required high transmission speeds, networks utilizes orthogonal frequency division multiplexing (OFDM) for downlink communications. Conversely, single-carrier frequency division multiplexing (SC-FDM) is used for uplink communications since the high Peak-to-Average Power Ratio (PAPR) property of OFDM makes the same less favorable for uplink communication. OFDM and SC-FDM partition the system bandwidth into multiple orthogonal sub-carriers. The spacing between adjacent sub-carriers may be fixed, and the total number of sub-carriers may be dependent on the system bandwidth. The system bandwidth may also be partitioned into sub-bands, where one sub-band is formed by a certain number of adjacent sub-carriers.

Nonetheless, a downlink communication may experience interference due to concurrent transmissions performed by neighboring cells. Conversely, an uplink communication may cause interference to concurrent transmissions performed by other UEs communicating with the neighboring cells. Such interferences degrade performance on both the downlink and uplink.

Networks usually implement frequency diversity techniques for communicating. In case of wideband communication systems (such as in LTE and LTE-A systems), frequency diversity allows a signal to be spread over the frequency domain, resulting in a higher resistance to frequency selective fading, natural interference and noise. For example, SC-FDMA may spread information through all the available sub-carriers, so in case of loss of partial information on one (or even more) sub-carriers does not necessarily lead to lose the information modulated in the communication.

Unfortunately, each different type of cell usually determines a corresponding transmission power level for the downlink, which may exacerbate interference issues between neighboring cells. In detail, macro-cells usually impose the highest downlink transmit power (e.g., 20 W) in the wireless telecommunication network to the connected UEs, granting each downlink communication to reach any UE in any point in the whole macro-cell. Conversely, pico-cells, and/or other types of small cells impose a lower downlink transmission power (e.g., down to 1 W), since their coverage areas are smaller than the ones of the macro-cells. Consequently, downlink communications with low transmission power may suffer severe interferences from having downlink communications with higher transmission power.

Similarly, the interference problem also arises in the uplink as a consequence of the different coverage areas of macro and pico-cells, and is exacerbated by the fact that a power control system may increases an uplink transmission power trying to overcome such interference potentially provoking further interferences between uplink transmissions of the same cell, which may lead to severe interfering scenarios. For example, considering a macro-cell enclosing a pico-cell, the uplink communications between UE connected to the pico-cell and the pico-cell itself are likely to suffer severe interferences from uplink transmission performed by UE connected to the macro-cell close to the pico-cell.

Moreover, power control procedures provided in the uplink for adjusting the transmission power levels of UEs cannot be directly used to avoid such interference problems. Indeed, the power control system of a cell is effective only on UEs connected to the same cell while any further UEs connected to another cell and causing interferences cannot be power controlled by the cell that is victim of the interference.

In the art, solutions have been proposed in order to reduce the interference arising in HetNet, devising methods for controlling the transmission power of the eNB and of UE connected to such eNB as disclosed in the paper 3GPP R3-121299, "Analysis of Solutions for Mitigation of UL Interference in CB-ICIC". TSG-RAN WG3 #76 Prague, Czech Republic, 21-25 May 2012.

Moreover the International patent application No. WO 2011/150296 discloses methods and an apparatus for uplink radio link monitoring in a Long Term Evolution system with enhanced inter-cell interference coordination. Various options are presented in an effort to transmit a sounding reference signal of a UE device served by an eNB in the HetNet, avoiding both interference from uplink transmissions from other UE being served by neighboring eNBs and collisions with the UE own channel quality information or physical uplink shared channel.

Furthermore, the International patent application No. WO 2012/048174 discloses systems and methods for managing inter-cell interference coordination actions for time-domain partitioned cells. In certain aspects, time-domain partitioning is accounted for by an eNB in determining whether to send frequency-based inter-cell interference information (e.g., uplink overload indicator) to neighboring eNB(s) and/or responsive actions to take in response for receiving frequency-based inter-cell interference information (e.g., uplink overload indicator, high interference indicator, and/or relative narrowband transmission power).

Finally, the International patent application No. WO 2012/024454 discloses an apparatus and a method for controlling inter-cell interference comprising detecting and measuring uplink interference; and reporting the level of the uplink interference to an inter cell interference coordination server using a backhaul link. The apparatus or method may include receiving a measured uplink interference level through a first backhaul link, determining a transmit power level based on the measured uplink interference level, and sending through a second backhaul link the transmit power level for reconfiguring either a UE or a Femto eNode B.

SUMMARY

The Applicant has found that the known solutions mentioned above fail in ensuring satisfactory interference immunity in the uplink communications.

Therefore, the Applicant has coped with the problem of devising a satisfactory solution able to suppress, at least partly, interferences arising between high transmission power UE connected an eNB and low transmission power UE connected to another eNB.

Particularly, one aspect of the present invention proposes a method for controlling a heterogeneous wireless network. The heterogeneous wireless network comprises at least one first base station which manages communication of a plurality of first user equipments positioned in at least one first cell and at least one second base station which manages communication of a plurality of second user equipments positioned in at least one second cell. Moreover, in the heterogeneous network, for each first user equipment the at least one first base station provides a respective first allocation information set over a respective first allocation time interval. Similarly, the at least one second base station provides for each second user equipment a respective second allocation information set over a respective second allocation time interval. Furthermore, each first allocation information set and each second allocation information set define transmission resources for communications of each first user equipment and each second user equipment, respectively. In the heterogeneous wireless network the at least one second cell is at least partially comprised in the first cell. The method comprises the following steps. Said at least one first base station determines a set of probably interfering first user equipments with at least one of the plurality of second user equipments. Said step of determining the set of probably interfering first user equipments comprises the following steps. Comparing each second allocation information set with each first allocation information set having the first allocation time interval at least partially overlapped with the respective second allocation time interval, and identifying as a probably interfering first user equipment each first user equipment for which a correspondence is verified in said comparing allocation information sets. The method further comprises the following steps. Said at least one second base station defines a detection time window in order to analyze univocal identifiers transmitted by probably interfering first user equipments in said set. The method comprises identifying a subset of effectively interfering first user equipments with the plurality of second user equipments. Said at least one first base station modifies said transmission resources for at least one first user equipment comprised in the subset of effectively interfering first user equipments in order to mitigate interferences.

Preferred features of the present invention are set in the dependent claims.

Another aspect of the present invention proposes a heterogeneous wireless network adapted to implement said method.

BRIEF DESCRIPTION OF THE DRAWINGS

These, and others, features and advantages of the solution according to the present invention will be better understood by reading the following detailed description of an embodiment thereof, provided merely by way of non-limitative example, to be read in conjunction with the connected drawings, wherein.

DETAILED DESCRIPTION

Figure 1:
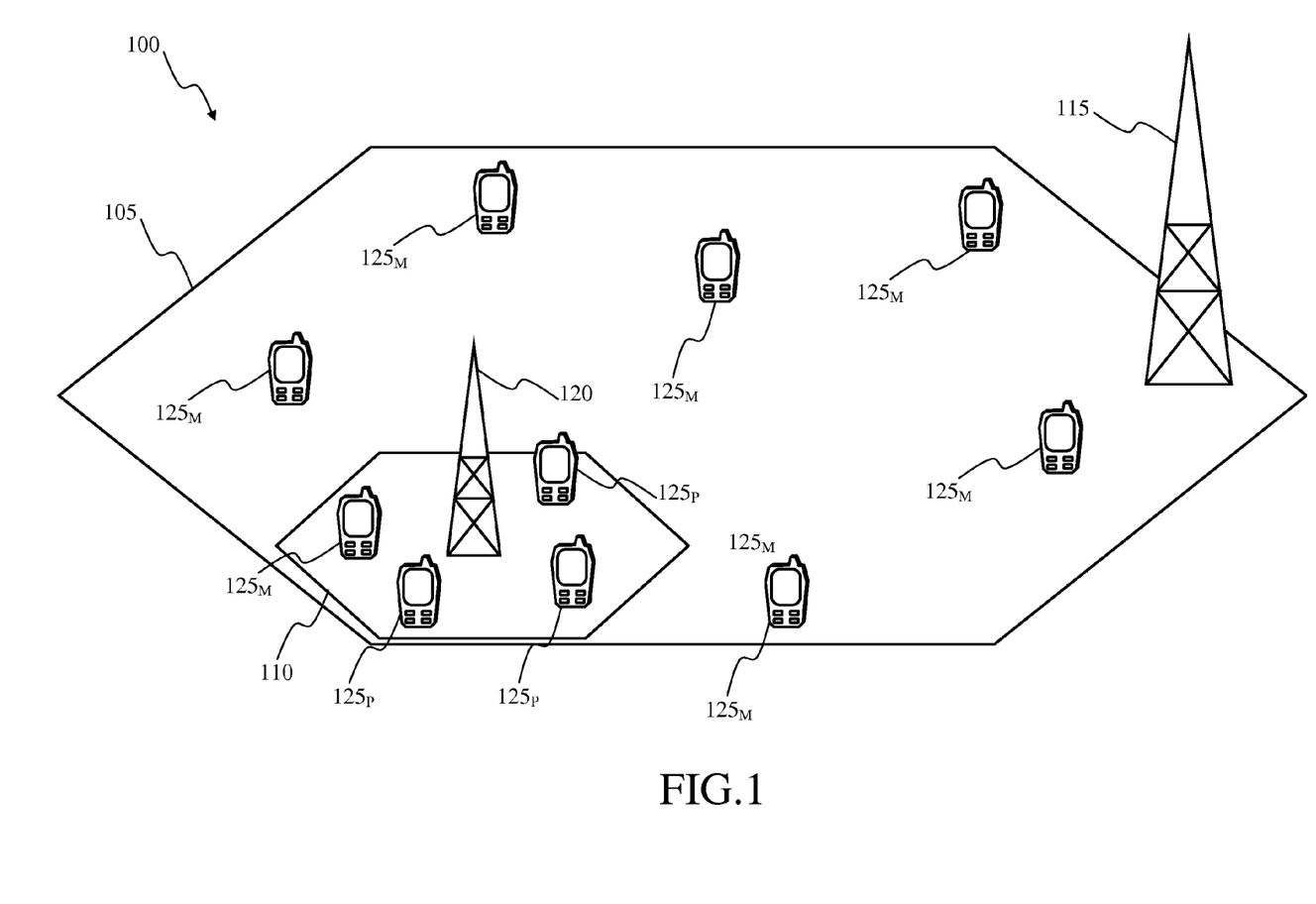
FIG. 1 is a schematic representation of a portion of a heterogeneous network with a macro-cell enclosing a pico-cell.

With reference to the figures, FIG. 1 is a schematic representation of a portion of a heterogeneous network, or HetNet 100, with a macro-cell 105 enclosing a pico-cell 110.

In detail, a Macro evolved Node B, or MeNB 115, provides radio coverage inside the macro-cell 105, whereas a Pico evolved Node B, or PeNB 120, provides radio coverage inside the pico-cell 110. In the example at issue, the pico-cell 110 is completely enclosed by the macro-cell 105. Therefore, inside the pico-cell 110 transmissions provided to/from the MeNB 115 are superimposed with transmissions provided to/from the PeNB 120.

In such a scenario, user equipments, or UEs, connected to the MeNB 115, referred to as MUE $125_M$ hereinafter, may happen to be positioned inside the pico-cell 110 also. Moreover transmissions performed by MUEs $125_M$ inside the pico-cell 110 or close to the same may potentially interfere with transmissions between UEs connected to the PeNB 120—referred to as PUE $125_P$ hereinafter—and the PeNB 120.

In greater detail, MUEs $125_M$ may generate a high interference towards the PeNB 120 due to high power level of the uplink transmission required to compensate the path loss (i.e., energy lost during transmission propagation) and reach the MeNB 115 with a sufficient power level to be correctly received. Indeed, uplink transmissions of the MUEs $125_M$ reach the PeNB 120 with relatively high power level. Particularly, the uplink transmissions of the MUEs $125_M$ closer to the PeNB 120 than to the MeNB 115 may even be received at the PeNB 120 with higher power levels than those received at the MeNB 115 due to transmission path difference between the MeNB 115 and the PeNB 120, since the energy lost by the MUEs $125_M$ uplink transmission before reaching PeNB 120 is smaller than the energy lost before reaching the MeNB 115.

In the solution according to an embodiment of the present invention, the HetNet 100 is adapted to nullify, or at least reduce, an interference at the PeNB 120, due to uplink transmissions of the MUEs $125_M$, thus increasing the quality and throughput experienced by communications between the PUEs $125_P$ and the PeNB 120 (uplink communications). Such advantages are obtained thanks to information exchanged between the MeNB 115 and the PeNB 120—and vice-versa the MeNB 115 and the PeNB 120—and suitable scheduling decisions taken at the MeNB 115 (as will be described in detail in the following).

Figure 2:
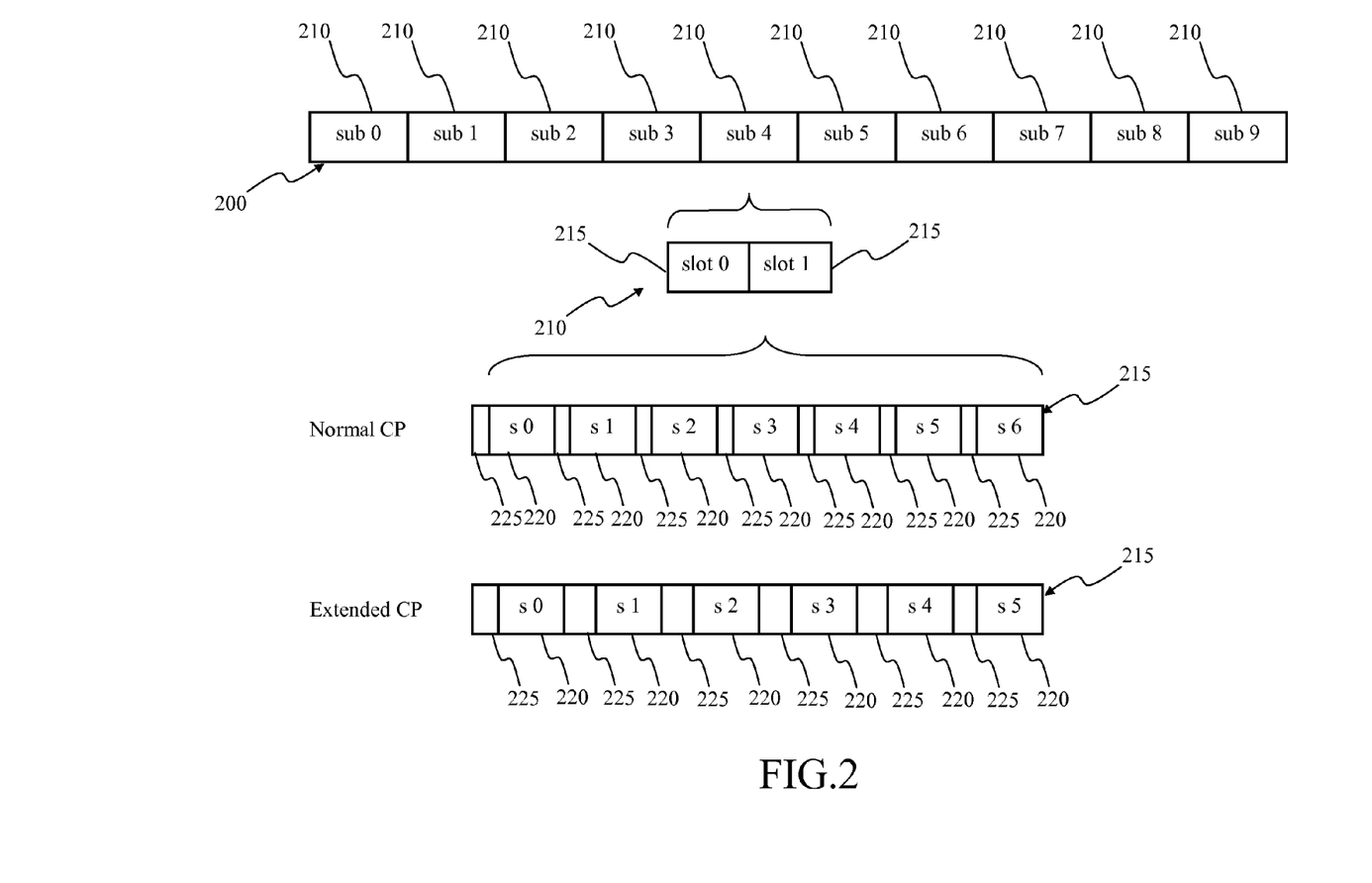
FIG. 2 is a schematic representation of a structure of a frame used in uplink communications.

Referring to FIG. 2 a typical structure of a frame 200 used in uplink transmission will now be described.

The generic uplink frame 200 has a standard duration Tf (e.g., Tf=10 ms). Such frame comprises ten sub-frames 210 also known as TTI (Transmission Time Interval). Generally, each sub-frame 210 has a duration Tsf (e.g., Tsf=1 ms) and, in its turn, comprises two time slots 215, each of which with a same duration (e.g., 0.5 ms). Therefore, each frame 200 may also be considered as a structure comprising 20 time slots 215.

Each time slot 215 is configured for containing a plurality of symbols 220 (i.e., electromagnetic pulses representing an integer number of bits to be transmitted). The number N of symbols in one time slot 215 is determined by a length of Cyclic Prefixes (CP) 225 associated to each symbol 220 in the time slot 215 (as will be described in the following). For example, a normal CP 225 determines seven symbols 220 (N=7) transmitted per time slot 215, while an extended CP 225 determines six symbols 220 (N=6) transmitted per time slot 215 since the extended CP 225 has a greater size with respect to the normal CP 225.

In detail, UEs $125_M$ and $125_P$ convert data to be transmitted into a sequence of modulated sub-carriers. Initially, data are modulated in order to form a sequence of modulated complex symbols. Such modulated complex symbols carriers are converted into N parallel data streams and a Discrete Fourier Transform (DFT) is performed on such data streams obtaining N DFT symbols, which are spread by the DFT operation over the available sub-carriers. Furthermore, the DFT symbols may be mapped to one of M (orthogonal) sub-carriers obtaining a set of complex symbols in the frequency domain. The complex symbols in the frequency domain may be transformed in time-domain symbols by means of an Inverse DFT (IDFT). After that, the CP is added to each symbol. The CP prefixes symbols with a copy of an end portion of the same symbol. Therefore, the CP facilitates the elimination the Inter Symbol Interference (ISI), and the repetition of the symbol end portion allows linear convolution to be modeled as circular convolution, which grants simpler frequency-domain processing.

The symbol is then ready to be transmitted. For example, let us consider communication between a generic MUE $125_M$ and the MeNB 115 (although the same consideration applies in communications between a generic PUE $125_P$ and the PeNB 120). Firstly, the MUE $125_M$ sends to the MeNB 115 a special signal denoted as Preamble Random Access Channel (PRACH) to request access to transmission channel (i.e., physical transmission medium for the communication) and wait for a response from the MeNB 115. The MeNB 115 schedules the uplink resources (i.e., component carriers, transmission bandwidth, sub-frames and sub-carriers etc.) by assigning selected time/frequency resources (also referred to as resource blocks in the art) to the MUE $125_M$ and informing the latter about transmission formats to use (by means of downlink transmission denoted as scheduling grant). Subsequently, the MUE $125_M$ is able to transmit symbols through the Physical Uplink Shared Channel (PUSCH) and Physical Uplink Control Channel (PUCCH). In detail, the PUSCH is used for the transmission of general data, while the PUCCH is used for the transmission of control information (e.g., Channel Quality Indicator—CQI—reports and ACK/NACK information related to data received in the downlink).

In addition, the HetNet 100 may comprise further features for enhancing high speed communication. For example, let us consider the HetNet 100 being adapted to operate according to 3GPP LTE and/or LTE-A standards. In this case, the HetNet 100 (as described in 3GPP LTE Release 8/9) may be able to support different channel bandwidths (e.g., 1.4, 3, 5, 10, 15 and 20 MHz bandwidths) for the serving carrier by scaling the size of the DFT operation used in the OFDM technique. This allows a large flexibility in system deployment considering the different spectrum availabilities in different regions and countries (i.e., the HetNet 100 may operate according to different regional communication standards with no, or minimal, adjustment).

Furthermore, the HetNet 100 may be able to scale the system bandwidth above a predetermined bandwidth size (e.g., 20 MHz), thanks to Carrier Aggregation feature (as disclosed in 3GPP LTE Release 10). In particular, by means of Carrier Aggregation, system bandwidths above a predetermined bandwidth size may be supported by simultaneously aggregating a corresponding number of carriers. For example, a system bandwidth of 100 MHz may be supported by the aggregation of five carriers of 20 MHz each (each of such aggregated carrier is usually denoted in the art as component carrier). The component carriers may be located on adjacent or non-adjacent frequency bands.

Figure 3:
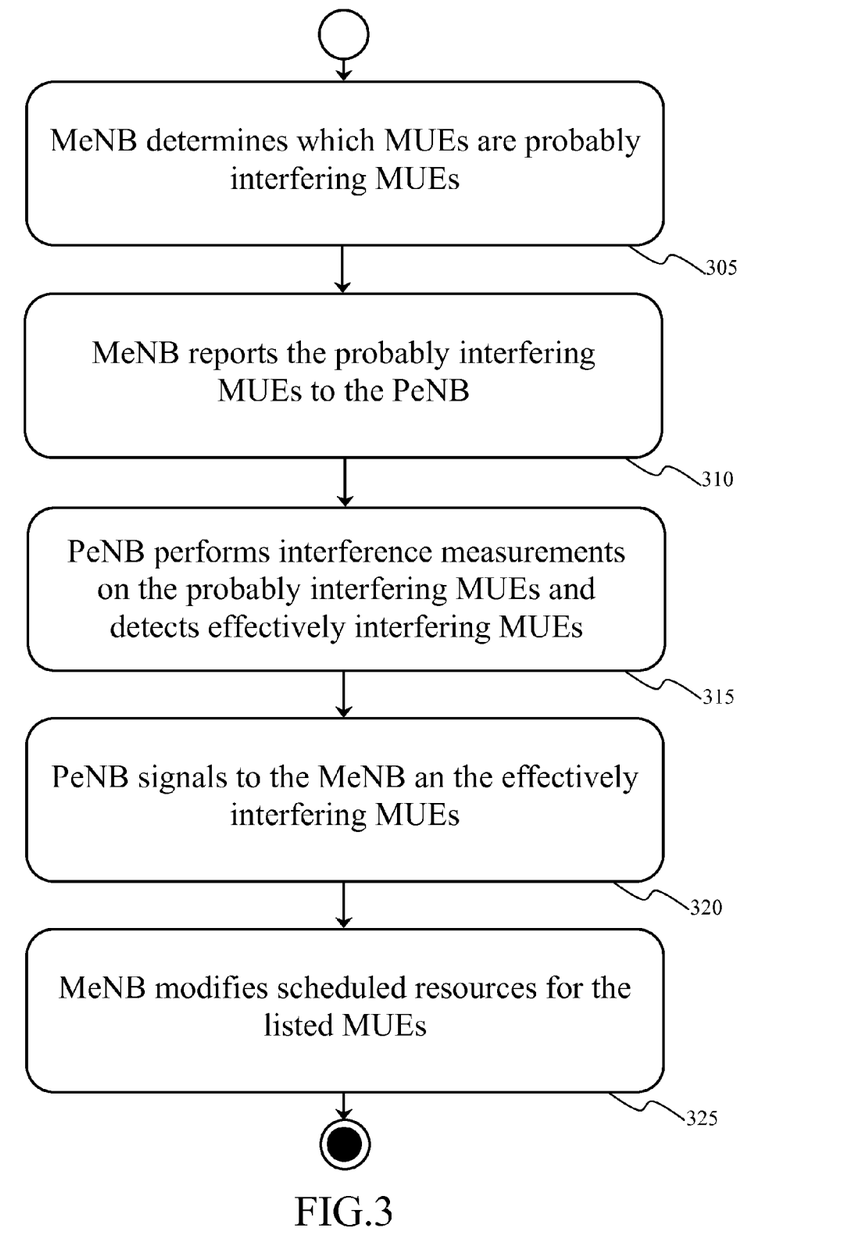
FIG. 3 is a flowchart schematically illustrating actions performed by evolved Nodes B in order to suppress interferences in a heterogeneous network according to an embodiment of the present invention.

Turning now to FIG. 3, it is a flowchart schematically illustrating actions performed by eNBs 115 and 120 in order to suppress interferences in the respective cells 105 and 110 of the HetNet 100 according to an embodiment of the present invention.

On a periodical basis or, alternatively, at randomly chosen time instants, the MeNB 115 determines (305) which MUEs $125_M$ are potentially source of interference (denoted as probably interfering MUEs $125_M$ hereinafter) for the uplink communications between PUEs $125_P$ and PeNB 120.

Then, the MeNB 115 reports (310) to the PeNB 120 a list of the probably interfering MUEs $125_M$.

The PeNB 120 performs interference measurements (315) on the probably interfering MUEs $125_M$ (comprised in the list received from the MeNB 115) and detects which probably interfering MUEs $125_M$ are effectively interfering MUEs $125_M$.

Subsequently, the PeNB 120 signals back (320) to the MeNB 115 an updated list comprising the effectively interfering MUEs 125$_M$.

Based on the updated list of the MUEs 125$_M$ received from the PeNB 120, the MeNB 115 modifies (325) scheduled resources (i.e., component carriers, transmission bandwidth, sub-frames and sub-carriers etc.) for the listed effectively interfering MUEs 125$_M$. By performing the abovementioned actions it is possible to suppress, or at least mitigate, the interferences caused by MUEs 125$_M$ transmissions against uplink transmissions between the PUEs 125$_P$ and PeNB 120, even if the PeNB 120 has no control over the transmission power level of the interfering MUEs 125$_M$ (as will be herein described in detail).

Advantageously, the MeNB 115 and the PeNB 120 are able to communicate together by means of a dedicated communication interface; for example, an X2 interface (in LTE/LTE-A standard). The X2 interface may be established between an eNB and its neighbor eNBs in order to exchange information when needed. Typically, the establishment of an X2 interface between two eNBs 115 and 120 is used to exchange traffic- or interference-related information.

Alternatively, in other embodiments of the present invention, the MeNB 115 and PeNB 120 may be controlled by network management units (e.g., a Network Controller, not shown in the figures) and all the actions for suppressing, or at least reducing, transmission interferences are performed by such central unit, which is adapted to communicate with the eNBs 115 and 120 of the HetNet 100; thus, without the need of establishing direct communications between MeNB 115 and PeNB 120.

In the following, each action performed in the HetNet 100 for suppressing, or at least reducing, interferences in uplink transmissions will be further analyzed in order to fully appreciate advantages associated with embodiments of the present invention.

The MeNB 115 has various options for determining which MUEs 125$_M$ are possible interferers for the PUEs 125$_P$-PeNB 120 transmissions. A first option for determining probably interfering MUEs 125$_M$ is to use measurements reported to the MeNB 115 by the MUEs 125$_M$, while communicating with the same MeNB 115.

Advantageously, although not limitatively, reported measurements are contained in control signals (e.g., Radio Resource Control—RRC) transmitted by the MUEs 125$_M$ toward the MeNB 115 already used in the HetNet 100 for network managing purposes.

In detail, such reported measurements comprise a list of eNBs neighboring each MUE 125$_M$. Thus, the MeNB 115 is able to determine which MUE 125$_M$ is a probably interfering MUE 125$_M$ by verifying the presence of the PeNB 120 among the neighboring eNB listed in the reported measurements. In addition or alternatively, in the case of absence of the PeNB 120 in the neighboring list of MUEs 125$_M$, the MeNB 115 is still able to determine if any of such MUE 125$_M$ is a probably interfering MUE 125$_M$ by verifying the presence in such neighboring list of one or more other eNBs (not shown in the drawings) of the HetNet 100 that are known to be geographically deployed close to the PeNB 120; for example, recognizing other eNBs positioned at a distance lower than a proximity threshold.

Moreover, it is possible to use the HetNet 100 planning information (i.e., a description of eNBs 115 and 120 comprised in the HetNet 100 featuring their geographical position, peak and average transmission power etc.) together with measurements reported by the MUEs 125$_M$ for simplify the determining of probably interfering MUEs 125$_M$. Particularly, information regarding distance between PeNB 120 and MeNB 115 and their coverage area (i.e., the extension of the pico-cell 110 and macro-cell 105, respectively) may be effectively exploited as an additional discriminating criterion for selecting probably interfering MUEs 125$_M$. For example, the MeNB 115 may be instructed to firstly verify the presence of the PeNB 120, which is the closest eNB in the HetNet 100, in the measures reported by the MUEs 125$_M$.

In addition, in an embodiment of the present invention, the MeNB 115 is able to perform a coarse determination of which MUE 125$_M$ is a probably interfering MUE 125$_M$ by exploiting a synchronization information, such as a timing advance signal, jointly with such planning information. The timing advance is used for synchronizing uplink transmissions of the MUEs 125$_M$ with the MeNB 115. Particularly, the timing advance is proportional to a distance between the MUE 125$_M$ and the MeNB 115. Therefore, it is possible to identify as probably interfering MUEs 125$_M$ each MUE 125$_M$ which is at a distance lower than a threshold distance from the PeNB 120 (known from the planning information).

It should be noted that other positioning system may provide a more precise identification of the probably interfering MUEs 125M. For example, by using a Global Positioning Signal (which may be provided by each MUEs 125$_M$) or positioning information (detected by a positioning server, not shown in the figures, which may be provided in the MeNB 115), it is possible to precisely know the position of the MUEs 125$_M$ and, therefore, verify which MUE 125$_M$ is a probably interfering MUE 125$_M$ at a distance from the PeNB 120 lower than the threshold distance (which position is known from the planning information).

Moreover, in order to efficiently determine probably interfering MUEs 125$_M$ it is possible to exploit an allocation information set, such as a scheduling grant, generated by the PeNB 120 for each PUE 125$_P$ which requests bandwidth for performing a communication. The scheduling grant is a downlink message used for the allocation of transmission resources both in downlink and in uplink. In detail each scheduling grant comprises different types of information: bandwidth allocation information (in terms of number and frequency position of the assigned resource blocks), information regarding the transmission scheme (e.g., number of simultaneously transmitted streams), Modulation/Coding Scheme (MCS) and power control commands. Ultimately, the transmission scheme information and MCS determine the asymptotic spectrum efficiency of the transmission (i.e., the number of communication bits per second that can be transmitted per Hertz of bandwidth) whereas the power control command determines the transmit power of the UE. As known, in high transmission speed HetNet 100, each eNB 115, 120 performs scheduling functions signaling the information listed above to the respective served UEs 125$_M$ and 125$_P$. Particularly, the scheduling grant generated by the PeNB 120 contains the information to be used by each PUE 125$_P$ for their communication with the PeNB 120. Therefore, if the PeNB 120 periodically transmits such scheduling grants also to the MeNB 115 together with corresponding time allocation information such as time stamps, the MeNB 115 is able to identify the probably interfering MUEs 125$_M$.

In detail, MUEs 125$_M$ having bandwidth allocation information (e.g., in terms of sub-frames and sub-carriers) similar to the bandwidth allocation information of the PUE 125$_P$ could be identified as probably interfering MUEs 125$_M$ if respective allocation time intervals—starting from the time instant indicated by the respective time stamps and extending substantially for a time duration corresponding to the transmission of the scheduling grant (for example, equal to a TTI, i.e. 1 ms)—are overlapped (at least in part). In other words, each MUE $125_M$ is identified as a probably interfering MUE $125_M$ if it has similar allocated resources to any PUE $125_P$ during similar time intervals.

A further method for determining probably interfering MUEs $125_M$, according to an embodiment of the present invention, provides that the MeNB 115 detects variations in the MCS provided by PeNB 120 to the PUEs $125_P$ over subsequent scheduling decisions (i.e., sequences of scheduling grants provided over a observation period). This information, together with the resources allocated to the PUEs $125_P$ (as defined by the respective scheduling grant), may be used for identifying as probably interfering MUEs $125_M$ each MUEs $125_M$ allocated over resource blocks that are totally or partially corresponding to the resource blocks allocated to one of the PUEs $125_P$ and characterized by partially or totally overlapped transmission time intervals if is detected a MCS reduction for such one of the PUEs $125_P$. The MCS reduction implies a spectrum efficiency degradation, which is due to a more robust modulation scheme and/or a lower coding rate provided by the PeNB 120 in order to enhance a protection of the communication of the PUEs $125_P$ against the interference generated by the MUEs $125_M$.

Moreover, the sequence of power control commands comprised in the scheduling grants (sent by PeNB 120 to the PUEs $125_P$) can be used by the MeNB 115 in order to identify probably interfering MUEs $125_M$. For example, an increment in the transmit power of the PUE $125_P$, eventually combined with the allocation information and/or with the MCS reduction (described above), may be used for identifying the probably interfering MUEs $125_M$. In detail, the increment in the transmit power of the PUEs $125_P$ above a power threshold give advice that uplink communications of the PUEs $125_P$ are subjected to interferences.

It should be noted that the just described expedients for determining the probably interfering MUEs $125_M$ are only examples of how such determination may be carried out, and thus they should not be considered as limiting in any way.

Once the MeNB 115 has determined the probably interfering MUEs $125_M$, the MeNB 115 transmits to the PeNB 120 allocation information (time and/or frequency information) for identifying such probably interfering MUEs $125_M$. For example, the MeNB 115 may transmits to the PeNB 120 a set of information related to the DeModulation Reference Signal (DMRS), each associated with a respective probably interfering MUE $125_M$. As it is known, DMRS is a univocal identifier for a transmission and, thus, also for the MUE $125_M$ which performed such transmission.

Figure 4A:
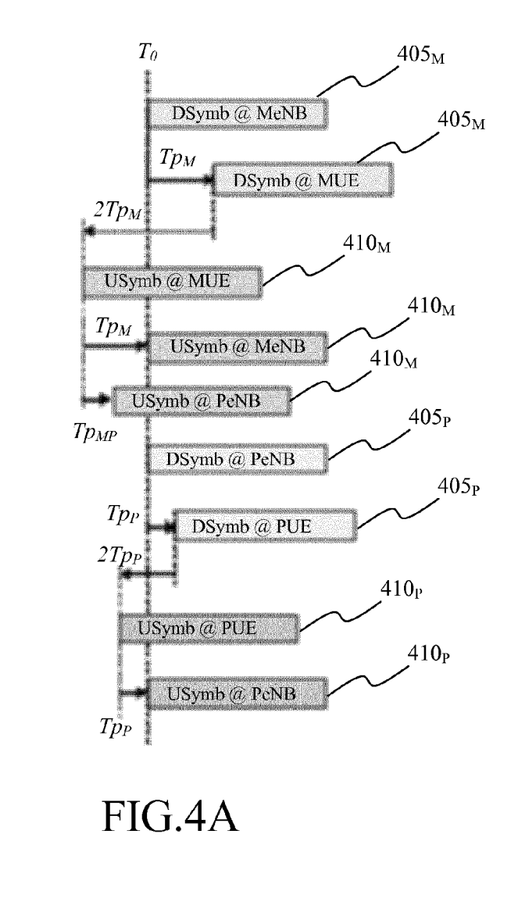
FIG. 4A is a schematic timing diagram of symbols transmitted in the heterogeneous network according to an embodiment of the present invention.

Considering now FIG. 4A, which is a schematic timing diagram of symbols transmitted in the HetNet 100, respectively, further features of the HetNet 100 according to an embodiment of the present invention will be disclosed.

For the sake of clarity, let us consider that the MeNB 115 and PeNB 120 are perfectly synchronized in downlink (condition attainable in the HetNet 100 by exchanging downlink synchronization signals between the MeNB 115 and the PeNB 120). In other words, a (macro) downlink symbol $405_M$ of the MeNB 115 and a (pico) downlink symbol $405_P$ of the PeNB 120 are transmitted at a same time instant $T_0$ that denotes the start of a downlink frame (for both MeNB 115 and PeNB 120).

Even in such circumstances, a (macro) uplink symbol $410_M$ transmitted by the MUE $125_M$ and an (pico) uplink symbol $410_P$ transmitted by the PUE $125_P$ to the PeNB 120 are not synchronized (i.e., their respective arrival time instants at the PeNB 120 are different). This is due to different propagation times (in their turns depending on different physical distances between each UE $125_M$ and $125_P$ and the eNB 115 and 120) and to the timing advance imposed by each eNB 115 e 120 to all the respectively served UEs $125_M$ e $125_P$. In detail, the timing advance is used for synchronizing symbols uplink transmissions (by anticipating, or delaying, an uplink transmission starting time) for each UE $125_M$,$125_P$, in order to receive all the uplink symbols $410_M$ and $410_P$ aligned at the serving eNB 115 and 120 receiver. Moreover, such alignment condition guarantees the orthogonality of the uplink-received signals thanks to the SC-FDMA signal properties.

The downlink symbol $405_M$ is received at the intended MUE $125_M$ after a propagation time $Tp_M$, while the downlink symbol $405_P$ is received at an intended PUE $125_P$ after a propagation time $Tp_P$. Similarly, the uplink symbol $410_M$ is received at the MeNB 115 after the propagation time $Tp_M$, and the uplink symbol $410_P$ is received at the PeNB 120 after the propagation time $Tp_P$. Moreover, the uplink symbol $410_M$ is received also at the PeNB 115 after the propagation time $Tp_{MP}$.

Advantageously, in order to help the PeNB 120 identifying the interfering MUEs $125_M$, the MeNB 115 may communicate to the PeNB 120 the timing advance associated with each probably interfering MUE $125_M$. Particularly, the MeNB 115 defines a respective timing advance for each MUE $125_M$ coping with a propagation time (i.e., a delay due to the distance between the MUE $125_M$ and the MeNB 115) of the MUE $125_M$ transmissions. The timing advance synchronizes symbols transmissions from the MUE $125_M$ with symbols reception of the MeNB 115 as a function of their distance.

In detail, thanks to the communicated timing advance, the PeNB 120 is then able to adjust a detection time window—the detection time window being a time period in which the uplink symbols $410_M$ is expected to be received at the PeNB 120—to correctly receive the DMRS associated to the probably interfering MUEs $125_M$. In general, the timing advance may be used for facilitating detection and identification of each probably interfering MUEs $125_M$ in order to improve the time accuracy in the DMRS detection by the PeNB 120.

Particularly, a time instant $t_1$ that represents the start of the detection time window used by the PeNB 120 for detecting the presence of the DMRS may be calculated as follows:

$$t_1 = T_0 - TA_{MeNB}$$

where $TA_{MeNB}$ is a time shift (e.g., a delay) corresponding to the timing advances imposed by the MeNB 115 to the MUEs $125_M$ and signaled (through the X2 interface) also to the PeNB 120.

Taking into account that more than one MUE $125_M$ may be analyzed by the PeNB 120 in a same TTI, the delay $TA_{MeNB}$ is chosen as $$TA_{MeNB} = \max\{TA_{MeNB}^1, TA_{MeNB}^2, \ldots, TA_{MeNB}^K\}$$

where K is the number of probably interfering MUEs $125_M$ analyzed for DMRS detection in the same TTI.

The length $\Delta$ of the detection time window used by the PeNB 120 for detecting effectively interfering MUEs $125_M$ should be instead determined as $$\Delta = \max\{Tp_{MP}^1, Tp_{MP}^2, \ldots, Tp_{MP}^K\}$$

where $Tp_{MP}^K$ is the propagation delay associated with a symbol transmitted by the Kth MUE $125_M$ (and intended to be received by the MeNB 115) received at the PeNB 120

(and probably interfering with PUEs $125_P$ uplink transmissions). However, the quantity $Tp_{MP}^K$ is not known to the PeNB 120, since there is no direct interaction between the PeNB 120 and the MUEs $125_M$.

Nevertheless, an estimation of such propagation delays $Tp_{MP}^K$ may be obtained by analyzing the timing advances sent by the PeNB 120 to the PUEs $125_P$. Preferably, although not limitatively, a design of the detection time window could be based on the maximum value of the timing advances sent by the PeNB 120 to the PUEs $125_P$ over a sufficiently long observation interval (i.e., an interval comprising a plurality of transmission frames). The length of this observation interval should be large enough in order to obtain a sufficient statistic that includes all the possible positions of the served PUEs, which substantially correspond to positions occupied by interfering MUEs $125_M$ in the pico-cell 110 (i.e., the strongest interfering MUEs $125_M$, which are closer to the PeNB 120 than interfering MUEs $125_M$ outside the pico-cell 110).

The length $\Delta$ of the detection time window used by the PeNB 120 may be thus be approximated as $$\Delta = \max\{Tp_{PP}^1, Tp_{PP}^2, \ldots, Tp_{PP}^M\}$$

where $Tp_{PP}^K$ is a propagation delay after which a symbol transmitted by the Kth PUE $125_P$ is received at the PeNB 120.

In order to minimize a computational effort, the search operation of the DMRS performed by the PeNB 120 can then be restricted over the time interval $[t_1; t_1+\Delta]$, where the length $\Delta$ of the detection time window may be updated on a long-term basis by collecting the timing advance statistics at the PeNB 120.

Alternatively the MeNB 115 may forward to the PeNB 120 a copy of configuration information comprised in a PRACH used by the probably interfering MUEs $125_M$. Such configuration information may be used by the PeNB 120 for estimating the associated propagation delay $Tp_{MP}^K$ and, thus, the length $\Delta$ of the detection time window. Particularly, the PRACH used in HetNet 100 contains configuration information necessary to synchronize the uplink transmission of UEs $125_M$ and $125_P$ with the respective eNB 115 and 120. Indeed, thanks to the copy of configuration information comprised in the PRACH, the PeNB 120 may be able to substantially identifying communications from the MUEs $125_M$ as performed by the MeNB 115.

In a further embodiment according to the present invention, the PeNB 120 may directly estimate the propagation delay $Tp_{MP}^K$ associated with the probably interfering MUEs $125_M$, by jointly using copy of configuration information comprised in the PRACH (received from the MeNB 115) and the corresponding timing advance information of the probably interfering MUEs $125_M$ signaled by the MeNB 115.

In one embodiment of the present invention, the PeNB 120 is equipped with two different operative blocks adapted to perform a Fast Fourier Transform (FFT, not shown in the figures), denoted as FFT blocks hereinafter for the sake of brevity, in order to detect, at the same time, the DMRS of probably interfering MUEs $125_M$ and of PUEs $125_P$. In detail, a first FFT block is associated to a first detection time window and is adapted to detect uplink symbols $410_P$ incoming from the PUEs $125_P$, while a second FFT block is associated to a second detection time window and is adapted to detect uplink symbols $410_M$ incoming from the MUEs $125_P$.

Figure 4B:
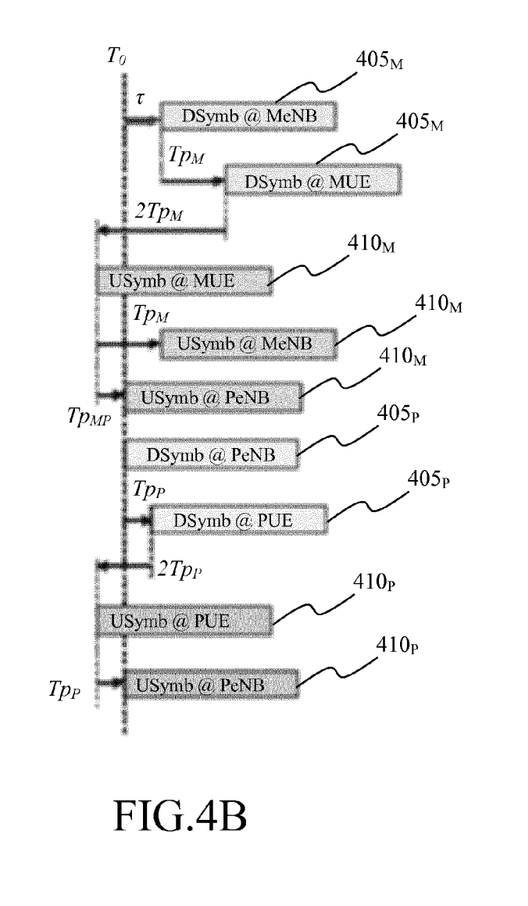
FIG. 4B is a schematic timing diagram of symbols transmitted in the heterogeneous network according to another embodiment of the present invention.

In one alternative embodiment of the present invention, of which a schematic timing diagram of symbols transmitted in the HetNet 100 is shown in FIG. 4B, in order to reduce the processing complexity, the downlink symbols transmitted by the MeNB 115 are advantageously time shifted, for example delayed, in a semi-static way (i.e., the delay being incremented over days, thus not compromising the MUEs $125_M$ synchronization with the HetNet 100). In the example at issue, the transmission of the downlink symbols by the MeNB 115 is offset by a delay $\tau$ set equal to $T_0 - TA_{MeNB}$. Such delay $\tau$ applied to the downlink symbols aligns the uplink symbols of the MUEs $125_M$ and PUE $125_P$ received at the PeNB 120. This allows the detection of each DMRS of both the MUEs $125_M$ and PUE $125_P$ with a single FFT block provided in the PeNB 120.

Preferably, although not limitatively, a Self-Organizing Networks (SON) algorithm may be provided in the HetNet 100 comprising the capability of automatically applying the delay $\tau$ to the MeNB 115 downlink frame in a semi-static way without any loss of synchronization between the MUEs $125_M$ and the rest of the HetNet 100. For example, the SON algorithm may be adapted to monitor downlink transmission timing in the cells 105, 110 of the HetNet 100 in order to estimate a preferred value for the delay $\tau$, and apply such delay $\tau$ daily to the downlink transmissions preferably during low-traffic periods (e.g., during nighttime) in the HetNet 100.

Generally, more than one pico-cell (and more than one PeNB) may be deployed at least partly in the same macro-cell. In such case, it is not possible synchronizing symbols transmissions at each PeNB by shifting the transmissions of the MeNB, since each PeNB communication normally has a different propagation time, physical distances from respective PUEs and timing advances with respect to others PeNBs. On the contrary, it is possible to estimate a time advance $\tau_P$ (for example as previously described for the delay $\tau$) for each PeNBs deployed at least partly in the same macro-cell. Then each time advance $\tau_P$ may be used to shift (anticipate) the downlink frame of the respective PeNB, thus aligning again the uplink symbols of the MUEs and PUEs at each PeNB.

It should be noted that a SON algorithm may be implemented also in a HetNet comprising a plurality of pico-cell deployed at least partly in the same macro-cell. The SON algorithm may be adapted to monitor downlink transmission timing in the cells, estimate the time advance $\tau_P$ corresponding to each PeNBs and apply such time advance $\tau_P$ periodically (e.g., daily) to the downlink transmissions preferably during low-traffic periods (e.g., during nighttime) in the HetNet 100.

At this point, the PeNB 120 is able to identify which probably interfering MUEs $125_M$ is an effectively cause of interferences measuring an indication of the transmission power of each probably interfering MUEs $125_M$, thanks to the information received from the MeNB 115 (i.e., DMRS configuration parameters). For example, the PeNB 120 may directly measure the power of such interfering uplink transmission incoming from the probably interfering MUEs $125_M$.

Each probably interfering MUE $125_M$ will be identified as an effectively interferer if the measured power level of the associated DMRS (i.e., uplink transmission power level) is greater than a predetermined threshold power level. Advantageously, such threshold power level may be set according to a maximum interferer power level which do not compromise uplink transmissions incoming from the PUEs $125_P$.

Alternatively, the PeNB 120 may estimate the interference associated with each probably interfering MUEs $125_M$ by utilizing the Signal to Interferer plus Noise Ratio (SINR).

The SINR calculation is typically performed by the PeNB 120 in order to evaluate the best Modulation and Coding Scheme (MCS) for the PUEs $125_P$. The MCS is selected in such a way to maximize the rate of successful symbols transmission (i.e., throughput) in the future transmission in order to allow the eNBs 115 and 120 for an efficient resource scheduling.

Advantageously, the PeNB 120 may identify effectively interfering MUEs $125_M$, among the probably interfering MUEs $125_M$, by verifying if a value of the SINR at the frequency (or frequencies) associated with the uplink transmission of each probably interfering MUEs $125_M$ falls below a minimum SINR value which do not compromise uplink transmissions incoming from the PUEs $125_P$. In this case the PeNB 120 assume that all the measured interference is generated by the interfering MUEs $125_M$ signaled by the MeNB 115.

It should be noted that using the SINR for determining the effectively interfering MUEs $125_M$ requires less processing power than power measurements, as the SINR estimation is already performed by the PUE 120 for estimating the best MCS to be provided in the scheduling grant. Conversely, power measurements are specifically performed for identifying the effectively interfering MUEs $125_M$. However, such SINR identification is sub-optimal compared to the power level measurement identification previously described. Indeed, the interference estimation based on the SINR measurement cannot always be univocally associated to one of the probably interfering MUEs $125_M$ signaled by the MeNB 115. For example, there can be other UEs (also not shown in the figures) served by other neighboring eNBs that contribute to the measured interference level superimposed with the probably interfering MUEs $125_M$ signaled by the MeNB 115—especially, if the PeNB 120 is at least partly comprised in more than one macro-cell (covered by other MeNB, not shown in the figures), close to the boundary of the enclosing macro-cell 105, or close to other PeNBs.

Afterwards, the PeNB 120 is able to signal the effectively interfering MUEs $125_M$ back to the MeNB 115 (again, through the X2 interface) with an updated list (for example, comprising DMRS configurations and/or measured power levels) identifying the effectively interfering MUEs $125_M$.

In addition, it should be noted that the synchronization between UEs $125_M$ and $125_P$ and the HetNet 100 impacts the subsequent power measurements performed by the PeNB 120; in particular, the ability of the PeNB 120 to identify the DMRS of the probably interfering MUEs $125_M$. Therefore, in order to relax synchronization requirements, the MeNB 115 may configure the extended CP for the symbols in the sub-frames to be analyzed by the PeNB 120. In detail, each transmitted symbol has to reach the intended receiver with a maximum delay equal to its own CP, and, since the extended CP is larger than the normal CP, the former relaxes synchronization requirements. However, such reconfiguration affects the HetNet 100 efficiency since the number resources available in the MeNB 115 are reduced (since with the extended CP only 6 symbols per slot may be transmitted).

According to an embodiment of the present invention, in order to limit such loss in efficiency, another SON algorithm may be provided in the HetNet 100 to be used to reconfigure resources of the sub-frames depending on the ability of the PeNB 120 to identify the DMRS of the probably interfering MUEs $125_M$. For example, the SON algorithm may be adapted to identify DMRS detection failures (i.e., when the PeNB 120 is not able to identify to which probably interfering MUE $125_M$ belongs the incoming uplink symbols $410_M$) and to instruct to the MeNB 115 to switch from normal CP to extended CP for symbols transmitted through a corresponding sub-frame. Alternatively, the PeNB 120 may be adapted to directly provide information of DMRS detection failures to the SON algorithm, or to the MeNB 115.

Finally, the MeNB 115 takes actions on the effectively interferer MUEs $125_M$ in order to suppress, or at least to substantially reduce, the interferences brought by the latter to the uplink transmissions between PUEs $125_P$ and the PeNB 120.

Preferably, although not necessarily, the MeNB 115 changes the allocation in the transmission band of the effectively interfering MUEs $125_M$. For example, the MeNB 115 may modify the scheduling of the resources for the effectively interfering MUEs $125_M$, in order to associate the latter with a different component carrier sets or with different sub-carriers sets (possibly orthogonal with respect to the component carrier/sub-carriers sets associated to PUEs $125_P$).

It should be noted that, since the quality of communications is impacted by the orthogonality between sub-carriers of the MUEs $125_M$ and of the PUEs $125_P$, in one embodiment of the present invention, the MeNB 115 and PeNB 120 may provide disjoint DMRS to the MUEs $125_M$ and PUEs $125_P$. Advantageously, the disjoint DMRS are selected in order to grant orthogonality between the sub-carriers of the MUEs $125_M$ and of the PUEs $125_P$. In this way, it is possible to attain lower interferences between uplink communications performed in the cells 105 and 110 than the case in which DMRS are assigned randomly. In addition, also the DMRS detection performed by the PeNB 120 is facilitated thanks to the separation of MUEs $125_M$ and PUEs $125_P$ granted by the orthogonality thereof.

The invention claimed is:

1. A method for controlling a heterogeneous wireless network that includes at least one first base station managing communication of a plurality of first user equipments positioned in at least one first cell, at least one second base station managing communication of a plurality of second user equipments positioned in at least one second cell, for each first user equipment the at least one first base station providing a respective first allocation information set over a respective first allocation time interval and the at least one second base station providing for each second user equipment a respective second allocation information set over a respective second allocation time interval, each first allocation information set and each second allocation information set defining transmission resources for communications of each first user equipment and each second user equipment, respectively, and the at least one second cell being at least partially comprised in the first cell, the method comprising:

determining, by said at least one first base station, a set of probably interfering first user equipments with at least one of the plurality of second user equipments, by:

comparing scheduling grants in each second allocation information set with scheduling grants in each first allocation information set having the first allocation time interval at least partially overlapped with the respective second allocation time interval, and identifying as a probably interfering first user equipment each first user equipment for which a correspondence is verified in said comparing allocation information sets;

defining, by said at least one second base station, a detection time window in order to analyze univocal identifiers transmitted by probably interfering first user equipments in said set, identifying a subset of effectively interfering first user equipments with the plurality of second user equipments; and modifying, by said at least one first base station, said transmission resources for at least one first user equipment comprised in the subset of effectively interfering first user equipments in order to mitigate interferences.

2. The method according to claim 1, wherein comparing each second allocation information set with each first allocation information set includes:

detecting a degradation of a spectrum efficiency comprised in each second allocation information set, and comparing each second allocation information set for which the degradation of the spectrum efficiency is detected with each first allocation information set having the first allocation time interval at least partially overlapped with the respective second allocation time interval.

3. The method according to claim 2, wherein determining the set of probably interfering first user equipments includes:

accessing physical position information of the at least one second base station in the heterogeneous wireless network, determining a distance between the at least one second base station and each first user equipment for which a correspondence is verified in said step of comparing, and the step of determining the set of probably interfering first user equipments further comprises identifying as a probably interfering first user equipment each first user equipment for which the corresponding distance is lower than a predetermined threshold distance.

4. The method according to claim 2, wherein determining the set of probably interfering first user equipments includes:

analyzing a neighboring list transmitted by each first user equipment to the at least one first base station, identifying as probably interfering first user equipment each first user equipment transmitting a neighboring list having an entry corresponding to the at least one second base station or a plurality of entries corresponding to further first base stations and/or further second base stations of the heterogeneous network having a physical position at a further distance lower than a proximity threshold from the at least one second base station.

5. The method according to claim 1, further comprising:

providing, by said at least one first base station, a set of univocal identifiers, each univocal identifier being associated with a corresponding probably interfering first user equipment of the set of probably interfering first user equipments, to the at least one second base station, and providing, by said at least one second base station, a subset of univocal identifiers, each univocal identifier in the subset being associated with a corresponding effectively interfering first user equipment of said subset, to the at least one first base station.

6. The method according to claim 5, wherein identifying a subset of effectively interfering first user equipments includes:

detecting at the at least one second base station at least one further univocal identifier being transmitted by a corresponding first user equipment, comparing the at least one further univocal identifier with each univocal identifier of the set of univocal identifiers, measuring a transmission power indication of communication performed by the first user equipments associated with the at least one further univocal identifier, and identifying as effectively interfering first user equipment each determined first user equipment which transmission power indication exceeds an interference power threshold.

7. The method according to claim 6, wherein the communication in the heterogeneous network is performed by transmitting at least one set of symbols, each symbol of said set being associated with a corresponding cyclic prefix, and identifying a subset of effectively interfering first user equipments includes:

recognizing a failure in the detection of the at least one further univocal identifier, and modifying the length of the corresponding cyclic prefixes of each symbol of the at least one set of symbols transmitted by first user equipments in order to facilitate the step of identifying a subset of effectively interfering first user equipments.

8. The method according to claim 7, wherein recognizing a detection failure in the detection of the at least one further univocal identifier is performed by the at least one second base station, and modifying the length of the corresponding prefixes of each symbol is performed by the at least one first base station.

9. The method according to claim 6, wherein defining a detection time window includes:

synchronizing communications of the at least one first base station and of the at least one second base station at a common time instant, identifying a synchronization information defining a respective communication time shift for each probably interfering first user equipment, determining a search start instant as a difference of said common time instant and a selected time shift, estimating an arrival time at the at least one second base station of communications from the set of probably interfering first user equipments, and determining the detection time window as difference of said start instant and said arrival time; and detecting each further univocal identifier includes:

searching from the search start instant for the detection time window for communications from the set of probably interfering first user equipments.

10. The method according to claim 9, wherein identifying synchronization information includes:

providing, by said at least one first base station a plurality of timing advances, each timing advance being associated with a corresponding probably interfering first user equipment, to the at least one second base station.

11. The method according to claim 9, wherein identifying synchronization information includes:

providing, by said at least one first base station a plurality of communication requests, each communication request being associated with a corresponding probably interfering first user equipment, to the at least one second base station.

12. The method according to claim 10, wherein determining a search start instant includes:

selecting a maximum timing advance among timing advances of each probably interfering first user equipment as the communication time shift.

13. The method according to claim 10, wherein estimating an arrival time includes:
identifying further synchronization information defining a further respective timing advance for each second user equipment of the plurality of second user equipments, and
selecting a further maximum timing advance among the further timing advances of each second user equipment as the arrival time.

14. The method according to claim 9, further comprising:
time shifting communications of the at least one first base station of a selected delay in order to align the arrival time at the at least one second base station of communications from the set of probably interfering first user equipments with a further arrival time of communications from the plurality of second user equipment.

15. The method according to claim 9, further comprising:
time shifting communications of the at least one second base station of a selected time advance in order to align the arrival time at the at least one second base station of communications from the set of probably interfering first user equipments with a further arrival time of communications from the plurality of second user equipment.

16. The method according to claim 6, further comprising:
imposing an orthogonality between univocal identifier and further univocal identifier of the plurality of first user equipments and of the plurality of second user equipments, respectively.

17. A heterogeneous wireless network comprising:
at least one first base station configured to manage communication of a plurality of first user equipments positioned in at least one first cell; and
at least one second base station configured to manage communication of a plurality of second user equipments positioned in at least one second cell,
wherein for each first user equipment the at least one first base station provides a respective first allocation information set over a respective first allocation time interval and the at least one second base station for each second user equipment a respective second allocation information set over a respective second allocation time interval,
each first allocation information set and each second allocation information set define transmission resources for communications of each first user equipment and each second user equipment, respectively, and
the at least one second cell is at least partially comprised in the first cell, the heterogeneous wireless network being configured to perform the method according to claim 1.

18. The heterogeneous wireless network according to claim 17, wherein the at least one first base station and the at least one second base station are configured to impose an orthogonality between univocal identifier and further univocal identifier of the plurality of first user equipments and of the plurality of second user equipments, respectively.

19. The heterogeneous wireless network according to claim 17, wherein the at least one second base station includes a first demodulation element configured to identify communication from the plurality of first user equipments, and a second demodulation element configured to identify communication from the plurality of second user equipments.

* * * * *